United States Patent [19]

Jinma et al.

[11] Patent Number: 5,692,340
[45] Date of Patent: Dec. 2, 1997

[54] SPACER FOR SEALING MEMBER

[75] Inventors: Hiroshi Jinma; Toshimitsu Shimizu; Toshikatsu Haraikawa, all of Chiba, Japan

[73] Assignee: Kinugawa Rubber Ind. Co., Ltd., Chiba, Japan

[21] Appl. No.: 520,751

[22] Filed: Aug. 29, 1995

[30] Foreign Application Priority Data

Aug. 30, 1994 [JP] Japan .................... 6-204704

[51] Int. Cl.$^6$ ............................ E06B 7/16
[52] U.S. Cl. ................. 49/479.1; 277/164
[58] Field of Search ............... 49/479.1, 498.1; 277/164; 285/DIG. 9; 138/121, 109, 96 R

[56] References Cited

U.S. PATENT DOCUMENTS

| 4,650,224 | 3/1987 | Smith .................. 285/165 |
| 4,804,019 | 2/1989 | Kramer, Jr. .......... 138/109 |
| 5,560,396 | 10/1996 | Kramer, Jr. .......... 138/109 |

FOREIGN PATENT DOCUMENTS

| 63-181564 | 11/1988 | Japan . |
| 1 500 822 | 8/1975 | United Kingdom . |
| 1 559 251 | 4/1977 | United Kingdom . |

Primary Examiner—Kenneth J. Dorner
Assistant Examiner—Curtis Cohen
Attorney, Agent, or Firm—Foley & Lardner

[57] ABSTRACT

A spacer for a sealing member, such as a weather-strip, of an opening/closing member of automotive vehicle is provided to prevent collapse of a hollow lip portion of the sealing member at corner portions thereof. The spacer may be formed cylindrically, or so as to conform to a shape of an inner surface of the hollow lip. In addition, an out wall of the spacer is segmented and formed with a bellows, or accordion-like configuration such that when the spacer, or any portion thereof, is contracted due to bending, or the like, affected segments or portions thereof at the spacer wall contract and are aligned so as to provide a substantially rigid, contiguous surface at the contraction.

4 Claims, 4 Drawing Sheets

SPACER FOR SEALING MEMBER

FIELD OF THE INVENTION

The present invention relates to a spacer for a sealing member. Specifically, the present invention relates to a spacer for a sealing members, such as a weather-strip, or the like, of a door mounting portion of an automotive vehicle, which can prevent collapse of a hollow lip portion of the sealing member at curved, or corner portions thereof.

DESCRIPTION OF THE RELATED ART

Referring to FIG. 7, in automotive vehicles, a sealing member, such as a weather-strip, is generally provided at peripheral edges of a vehicle door 1, windows, and other opening/closing members attached to the vehicle body for insulation, soundproofing, waterproofing, and the like. However, in recent years, some vehicles have been provided with a body side welt 2, such as shown in FIGS. 5 and 6, instead of such a weather-strip.

As seen in FIGS. 5 and 6, such a body side welt 2 includes a welt portion 3 and a hollow lip portion 4. Some body side welts 2 are formed such that a hollow spacer 5 may be inserted in the hollow lip portion 4 at corners thereof, as shown in FIG. 5, so as not to allow the hollow lip portion 4 to be creased, or crushed at corner portions thereof due to repeated opening and closing operation of the door (opening/closing member). One such hollow spacer for a sealing member has been disclosed in Japanese Utility Model Application First Publication (unexamined) No. 63-181564.

However, according to the above described structure, if the magnitude of a radius of curvature of the corner portion is greater than about 60 mm, the hollow lip portion 4 may be caused to buckle even through such a spacer portion may be inserted. On the other hand, a solid spacer (not shown) may be employed for surely preventing crushing of the hollow lip portion 4 even at sharp corners. However, provision of such a solid spacer cannot react with the same resilient characteristics as the hollow lip portion 4 during normal opening and closing operation of the door. Thus, such a solid spacer interferes with normal operation of the door and degrades the operability and overall quality of the opening/closing members and the vehicle.

Accordingly, it has been required to provide a spacer for a sealing member of an opening/closing member that prevents damage to the sealing member due to crushing, deformation, or the like, while allowing optimal unimpeded operation of the opening/closing member in the presence of the spacer.

SUMMARY OF THE INVENTION

Thus, it is an object of the present invention to overcome the drawbacks of the related art.

It is also an object of the invention to provide a spacer for a sealing member of an opening/closing member that may prevent crushing, deformation, and the like, of the sealing member while allowing optimal unimpeded operation of the opening/closing member in the presence of the spacer.

It is a further object of the invention to provide a spacer for preventing collapse of a sealing member at curved portions of the sealing member, which spacer is simple in structure and low in cost.

According to one aspect of the invention, there is provided a spacer for a sealing member inserted in a hollow lip portion of the sealing member for preventing flattening of the hollow lip portion at a curved portion thereof, comprising: a spacer having a cylindrical configuration of an outer wall thereof, wherein the cylindrical outer wall is formed as a bellows, having alternating larger and smaller circumference segments, such that, when all or part of the cylindrical outer wall is contracted, the larger circumference segments at a contraction are aligned so as to form a substantially contiguous, cylindrical external surface.

DESCRIPTION OF THE PREFERRED EMBODIMENT

Figure 1:
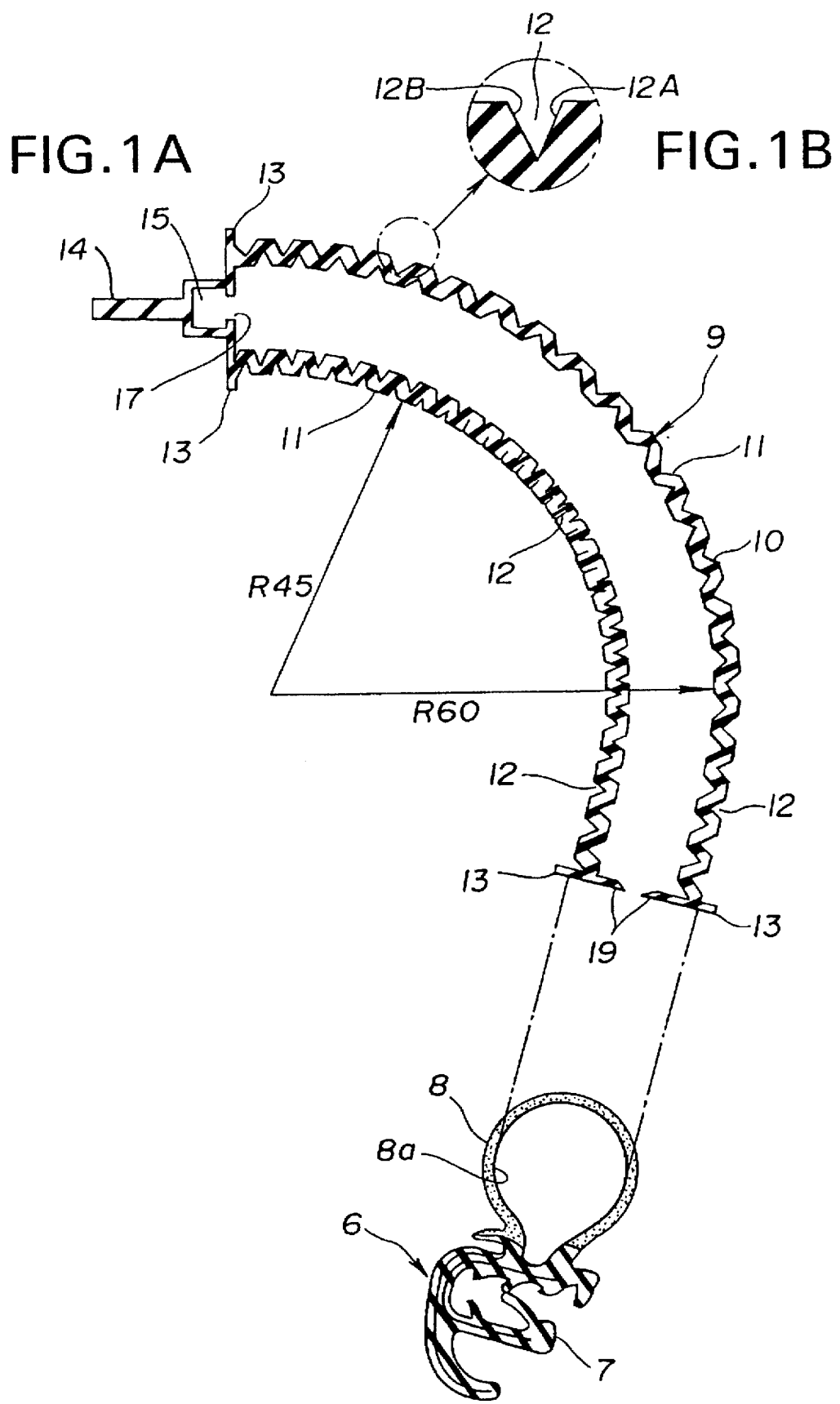
FIG. 1 is a cross-sectional side view of a preferred embodiment according to the invention.

Hereinbelow, a preferred embodiment of the invention will be explained in detail with reference to the drawings. Referring to FIGS. 1–4, a sealing member at a body side peripheral edge for receiving an opening/closing member of an automotive vehicle includes a body side welt 6 having a substantially U-shaped base portion 7 engaged with a flange portion (not shown) of a vehicle body, and a hollow lip 8 attached to the base portion 7 at an outer side thereof. A spacer 9 is inserted into the hollow lip 8 along a portion thereof at which the body side welt 6 is mounted in a curved state.

A main body 10 of the spacer is formed as a cylindrical member of hard rubber, resilient synthetic resin, or the like, having a first, open end and a second, closed end. The cylindrical main body 10 is formed of alternating bellows segments 11 and substantially V-shaped articulating grooves 12 allowing the spacer 9 to be curved without collapse of the cylindrical contour thereof, such that the hollow lip 8 of the body side welt 6 is prevented from creasing and/or crushing when mounted in such a curved state.

According to the above-described structure, when the spacer 9 is subjected to bending (i.e. is positioned in a curved state), as shown in FIG. 1, the grooves 12 are closed on the contracted side, that is, a side having the smaller radius of curvature, such that the bellows segments 11 are aligned adjacently so as to form a substantially contiguous surface.

Specifically, even if a substantially small radius of curvature (ie. 45 mm or less) is present on the contracted side, side wall portions 12A, 12B of the V-shaped groove closely contact each other to leave no recessed contour on the contracted area of the external surface.

Moreover, a flange-like protrusion 13 is formed so as to projected radially from each end face of the spacer main body 10. The protrusions 13, 13 serve to create frictional force against an internal wall 8a of the hollow lip 8 of the body side welt 6, so as to prevent displacement and/or dislodgement or the like, of the spacer 9.

Further, a holding protrusion 14 is formed on an outer side of the closed end of the spacer main body 10 so as to extend in the longitudinal direction of the spacer 9.

Figure 2:
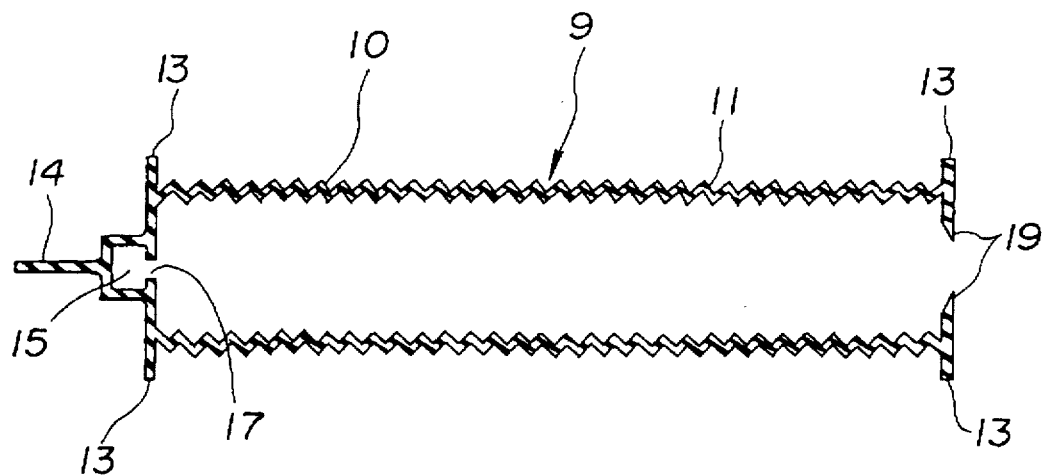
FIG. 2 is a cross-sectional side view of the spacer of FIG. 1 in a linear state.
Figure 3:
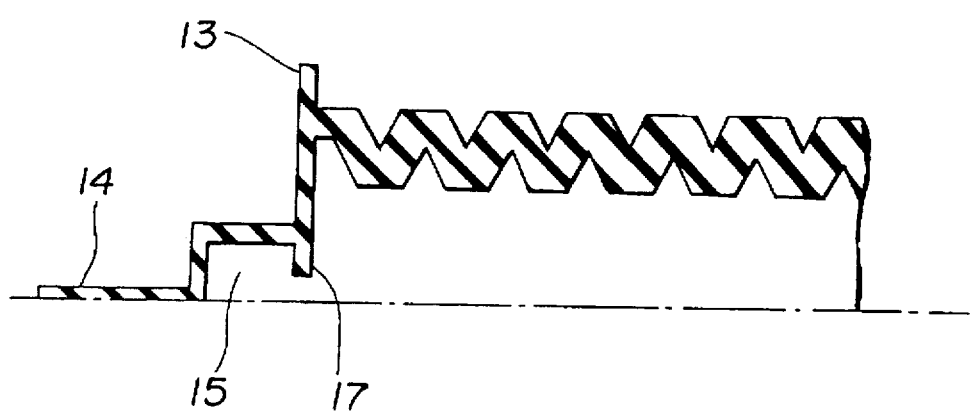
FIG. 3 is an enlarged cross-sectional view of a major portion of FIG. 2.

In addition, as may be seen in FIGS. 1, 2 and 3, the holding protrusion 14 at the closed end of the spacer main body 10 is projected from an engaging portion 15 formed as a smaller diameter portion projected from an annular outer flange 13 provided at the closed end. The engaging portion 15 is hollow and, at a portion between an interior space of the spacer main body 10 and the space within the hollow engaging portion 15, a small diameter connecting opening 17 is defined.

As will be described in detail here in later, the engaging portion 15 is designed to engage a pointed end of a spacer inserting jig 18.

It will further be noted from the drawings that the open end of the spacer 9 is also provided with an annular outer flange 13, around an opening of the open end, an inwardly projecting guide flange 19 is defined.

Figure 4:
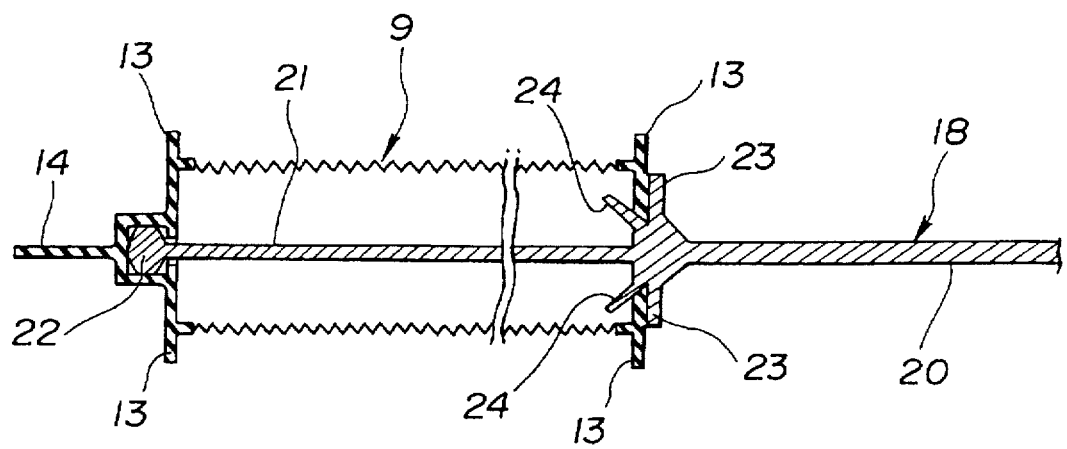
FIG. 4 is a cross-sectional view of a mounted condition of a spacer inserting jig.
Figure 5:
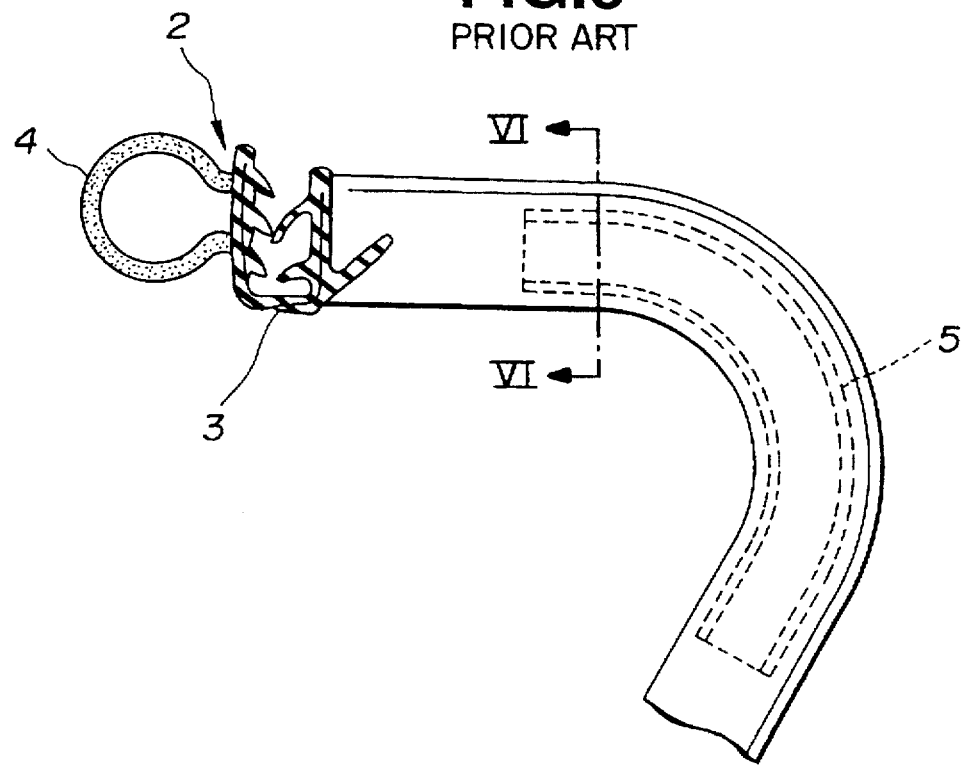
FIG. 5 is a cross-sectional view of a conventional body welt portion of an automotive sealing member.
Figure 6:
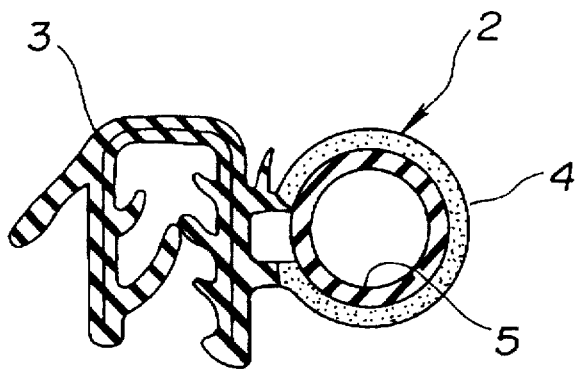
FIG. 6 is a sectional view along line VI—VI of FIG. 5.
Figure 7:
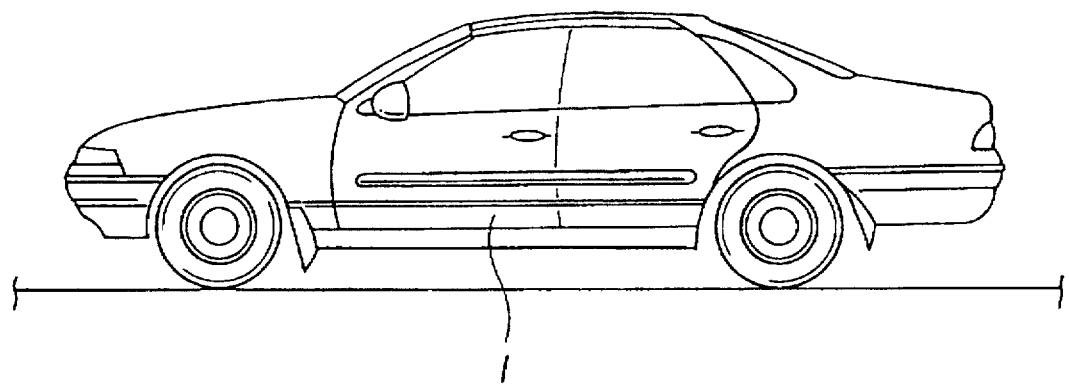
FIG. 7 is a side view of an automotive vehicle to which the present invention may be applied.

Referring now to FIG. 4, a cross-section view of the spacer inserting jig 18 engaged with the open end of the spacer 9 is shown. As may be seen, the inserting jig 18 according to the present embodiment comprises a handle 20 having a flange-like annular pressing portion formed at a base thereof. Further, a hook portion 24 is projected at a selected angle from a side of the pressing portion 23 opposite the handle 20 such that the pressing portion 23 and the hook portion 24 may cooperate on opposite sides of the guide flange 19 so as to firmly retain the open end of the spacer 9. In addition, an insertion blade 21 extends from the pressing portion 23 along the same axis as the handle 20. At an end of the insertion blade, an end retaining member 22 if formed having a configuration for allowing insertion thereof through the small diameter opening 17 provided between the inside of the spacer main body 10 and the interior of the engaging portion 15 such that the retaining member 22 may be snugly received within the engaging portion 15. According to this structure, as may be seen in FIG. 4, the spacer inserting jib securely retains the spacer 9 in a compressed condition of the main body 10 so as to facilitate insertion of the spacer 9 within a portion of the hollow lip 8 of the body side welt 6.

Particularly, the compressed spacer may be easily pushed into the hollow space of the hollow lip 8 allowing sure insertion of the spacer. Further, by gripping the holding protrusion 14 by sqeezing the hollow lip proximate the closed end of the inserted spacer and pulling the handle 20, the inserting jig 18 may be neatly disengaged from the spacer 9 and removed from the hollow lip 8 of the body side welt. Also, according to the bellows configuration of the walls of the main body 10, the spacer bends flexibly so as to sufficiently support the hollow lip 8 even when mounted to a portion of said body side welt 6 having a small radius of curvature. Suitable curving of the spacer may be easily achieved without danger of crushing or other damage being imparted to the hollow lip 8. Since the outer surface of the bellows segments 11 are brought closely adjacent each other according to bending of the spacer 9, a substantially contiguous surface is formed at the bend such that the contours of the bellows segments do not act to deform the hollow lip 8 from within, thus optimal appearance and sealing performance are reliably maintained.

Further, upon insertion of the spacer 9 into the hollow lip 8 via the inserting jig 18, the annular outer flanges 13, 13 at each end of the spacer 9 firmly engage an inner wall 8a of the hollow lip such that displacement of the spacer is prevented.

Thus, according to the invention as set forth above, a hollow lip portion of a sealing member is prevented from crushing or damage due to opening/closing operation of the opening/closing member even when a curved portion of the hollow lip at the spacer has a substantially small radius of curvature (i.e. 60 mm or less).

Further, at a side of the spacer having the smaller radius of curvature, the spacer segments are contracted to provide a substantially contiguous surface preventing creasing of the hollow lip.

In addition, the protrusion provided at one end of the spacer according to the invention surely prevents displacement of the spacer over extended periods of use.

Also, since the spacer of the invention includes an inserting jig integrally formed therewith, installation, removal and replacement, or other servicing thereof is greatly simplified.

The present invention is not limited only to the description as herein disclosed but may be modified and embodied in other ways without departing from the scope or inventive concept of the invention as set forth above.

What is claimed is:

1. A combination of a spacer and an insertion jig for inserting the spacer into a hollow lip portion of a sealing member to prevent flattening of the hollow lip portion at a curved portion thereof, wherein the spacer comprises a flexibly resilient tube having a substantially cylindrical outer wall, the cylindrical outer wall comprising a plurality of adjacently arranged bellows segments having grooves formed therebetween, wherein when all or part of the cylindrical outer wall is contracted, larger outer annular peripheral segments at contraction are aligned to form a substantially contiguous external surface, wherein the flexibly resilient tube has a closed end portion and an open end portion, wherein the closed end portion has an axially extending engaging portion communicating with an interior space of the tube, wherein the open end portion has a guide flange defining an open end face; and wherein the inserting jig comprises an annular pressing member, a handle extending from one side of the annular pressing member and an insertion blade extending substantially collinearly with the handle from an opposite side of the annular pressing member, the annular pressing member having a hook portion projecting away from the handle at a predetermined angle, wherein the insertion blade has an enlarged end portion adapted to be inserted into the engaging portion, wherein the hook portion is adapted to be inserted into the open end face of the guide flange.

2. A combination as set forth in claim 1, wherein the axially extending engaging recess portion serves as a handle during removal of the insertion jig, wherein the engaging portion is adapted to be gripped through the hollow lip during removal of the insertion jig to positionally retain the spacer.

3. A combination as set forth in claim 1, wherein the outer annular peripheral portions are flat, forming the substantially contiguous external surface at contraction.

4. A combination as set forth in claim 3, wherein each of the grooves has a V-shape in an unflexed condition between each of the bellows segments and includes first and second groove walls respectively associated with a different one of the adjacent bellows segments, the first and second groove walls converging at an angle to join at a circular groove bottom having a diameter less than that of the larger outer annular peripheral portions.

* * * * *